(12) United States Patent
Nguyen et al.

(10) Patent No.: US 12,417,279 B2
(45) Date of Patent: *Sep. 16, 2025

(54) SPAMMY APP DETECTION SYSTEMS AND METHODS

(71) Applicant: Proofpoint, Inc., Sunnyvale, CA (US)

(72) Inventors: Harold Nguyen, Burlingame, CA (US); Ali Mesdaq, San Jose, CA (US); Daniel Oshiro Nadir, Carlsbad, CA (US); Anthony Lawrence Dorie, San Francisco, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 380 days.

This patent is subject to a terminal disclaimer.

(21) Appl. No.: 18/172,866

(22) Filed: Feb. 22, 2023

(65) Prior Publication Data

US 2023/0205871 A1 Jun. 29, 2023

Related U.S. Application Data

(63) Continuation of application No. 17/035,320, filed on Sep. 28, 2020, now Pat. No. 11,615,182, which is a
(Continued)

(51) Int. Cl.
*H04L 29/06* (2006.01)
*G06F 21/54* (2013.01)
(Continued)

(52) U.S. Cl.
CPC ............ *G06F 21/54* (2013.01); *G06F 21/554* (2013.01); *G06Q 50/01* (2013.01); *H04L 63/1408* (2013.01)

(58) Field of Classification Search
None
See application file for complete search history.

(56) References Cited

U.S. PATENT DOCUMENTS 9,668,023 B1 * 5/2017 Twyman .............. G06V 40/172
9,805,018 B1 * 10/2017 Richfield ............ G06F 16/9535
(Continued)

OTHER PUBLICATIONS

Kuruvilla, Antu Mary; Varghese, Saira. A detection system to counter identity deception in social media applications. 5 International Conference on Circuits, Power and Computing Technologies [ICCPCT—2015]. https://ieeexplore.ieee.org/stamp/stamp.jsp?tp=&arnumber=7159321 (Year: 2015).*
(Continued)

*Primary Examiner* — Jeremiah L Avery
(74) *Attorney, Agent, or Firm* — Sprinkle IP Law Group

(57) ABSTRACT

A spammy app detection system may search a database for any new social media application discovered during a recent time period. A spammy app detection algorithm can be executed on the spammy app detection system on an hourly basis to determine whether any of such applications is spammy (i.e., posting to a social media page anomalously). The spammy app detection algorithm has a plurality of stages. When a new social media application fails any of the stages, it is identified as a spammy app. The spammy app detection system can update the database accordingly, ban the spammy application from further posting to a social media page monitored by the spammy app detection system, notify an entity associated with the social media page, further process the spammy application, and so on. In this way, the spammy app detection system can reduce digital risk and spam attacks.

20 Claims, 6 Drawing Sheets

Related U.S. Application Data continuation of application No. 15/939,161, filed on Mar. 28, 2018, now Pat. No. 10,789,355.

(51) Int. Cl.
*G06F 21/55* (2013.01)
*G06Q 50/00* (2012.01)
*H04L 9/40* (2022.01)

(56) References Cited

U.S. PATENT DOCUMENTS

| | | | | |
|---|---|---|---|---|
| 10,142,381 | B2* | 11/2018 | Nathan | H04L 67/53 |
| 10,346,410 | B2* | 7/2019 | Saperstein | H04L 63/20 |
| 10,600,054 | B2* | 3/2020 | Sahadevan | G06Q 20/384 |
| 10,601,857 | B2* | 3/2020 | Bulut | H04L 63/1441 |
| 11,315,010 | B2* | 4/2022 | Esman | H04L 67/02 |
| 12,277,247 | B2* | 4/2025 | Jakobsson | H04L 9/30 |
| 2008/0034425 | A1* | 2/2008 | Overcash | G06F 21/55 |
| | | | | 726/22 |
| 2008/0060051 | A1* | 3/2008 | Lim | G06Q 10/10 |
| | | | | 726/1 |
| 2010/0306249 | A1* | 12/2010 | Hill | G06F 16/9535 |
| | | | | 707/769 |
| 2014/0067656 | A1* | 3/2014 | Cohen Ganor | G06Q 50/01 |
| | | | | 705/39 |
| 2015/0120583 | A1* | 4/2015 | Zarrella | G06F 16/906 |
| | | | | 705/317 |
| 2015/0264082 | A1* | 9/2015 | Belva | H04L 63/1433 |
| | | | | 726/25 |
| 2017/0061005 | A1* | 3/2017 | Purcell | H04L 67/306 |
| 2017/0061404 | A1* | 3/2017 | Tunnell | G06Q 20/327 |
| 2017/0134418 | A1* | 5/2017 | Minoli | H04L 63/1433 |
| 2017/0195386 | A1* | 7/2017 | Nathan | H04L 67/56 |
| 2017/0251013 | A1* | 8/2017 | Kirti | H04L 63/1441 |
| 2017/0344648 | A1* | 11/2017 | Twyman | G06F 16/7867 |
| 2018/0034850 | A1* | 2/2018 | Turgeman | G06Q 30/0275 |
| 2018/0084012 | A1* | 3/2018 | Joseph | H04L 63/20 |
| 2018/0225605 | A1* | 8/2018 | Fabara | G06Q 10/0635 |
| 2019/0166150 | A1* | 5/2019 | Bulut | H04L 63/1441 |
| 2019/0318100 | A1* | 10/2019 | Bhatia | G06F 21/554 |
| 2020/0389469 | A1* | 12/2020 | Litichever | H04W 12/12 |

OTHER PUBLICATIONS

Wang, Rui et al. Machine Learning Based Cross-Site Scripting Detection in Online Social Network. 2014 IEEE Intl Conference on HPCC, 2014 6th Intl Symposium on CSS, 2014 IEEE 11th ICESS. https://ieeexplore.ieee.org/stamp/stamp.jsp?tp=&arnumber=7056839 (Year: 2014).*

Tsikerdekis, Michail; Zeadally, Sherali. Multiple Account Identity Deception Detection in Social Media Using Nonverbal Behavior. IEEE Transactions on Information Forensics and Security, vol. 9, Issue: 8. https://ieeexplore.ieee.org/stamp/stamp.jsp?tp=&arnumber=6843931 (Year: 2014).*

Ordonez-Ante, Leandro et al. Interactive querying and data visualization for abuse detection in social network sites. 2016 11th International Conference for Internet Technology and Secured Transactions (ICITST). https://ieeexplore.ieee.org/stamp/stamp.jsp?tp=&arnumber=7856676 (Year: 2016).*

Bansai, Harpreet; Misra, Manoj. Sybil Detection in Online Social Networks (OSNs). 2016 IEEE 6th International Conference on Advanced Computing (IACC). https://ieeexplore.ieee.org/stamp/stamp.jsp?tp=&arnumber=7544900 (Year: 2016).*

Fonseca, Hugo et al. A Facebook event collector framework for profile monitoring purposes. 2014 IEEE Symposium on Computers and Communications (ISCC). https://ieeexplore.ieee.org/stamp/stamp.jsp?tp=&arnumber=6912474 (Year: 2014).*

* cited by examiner

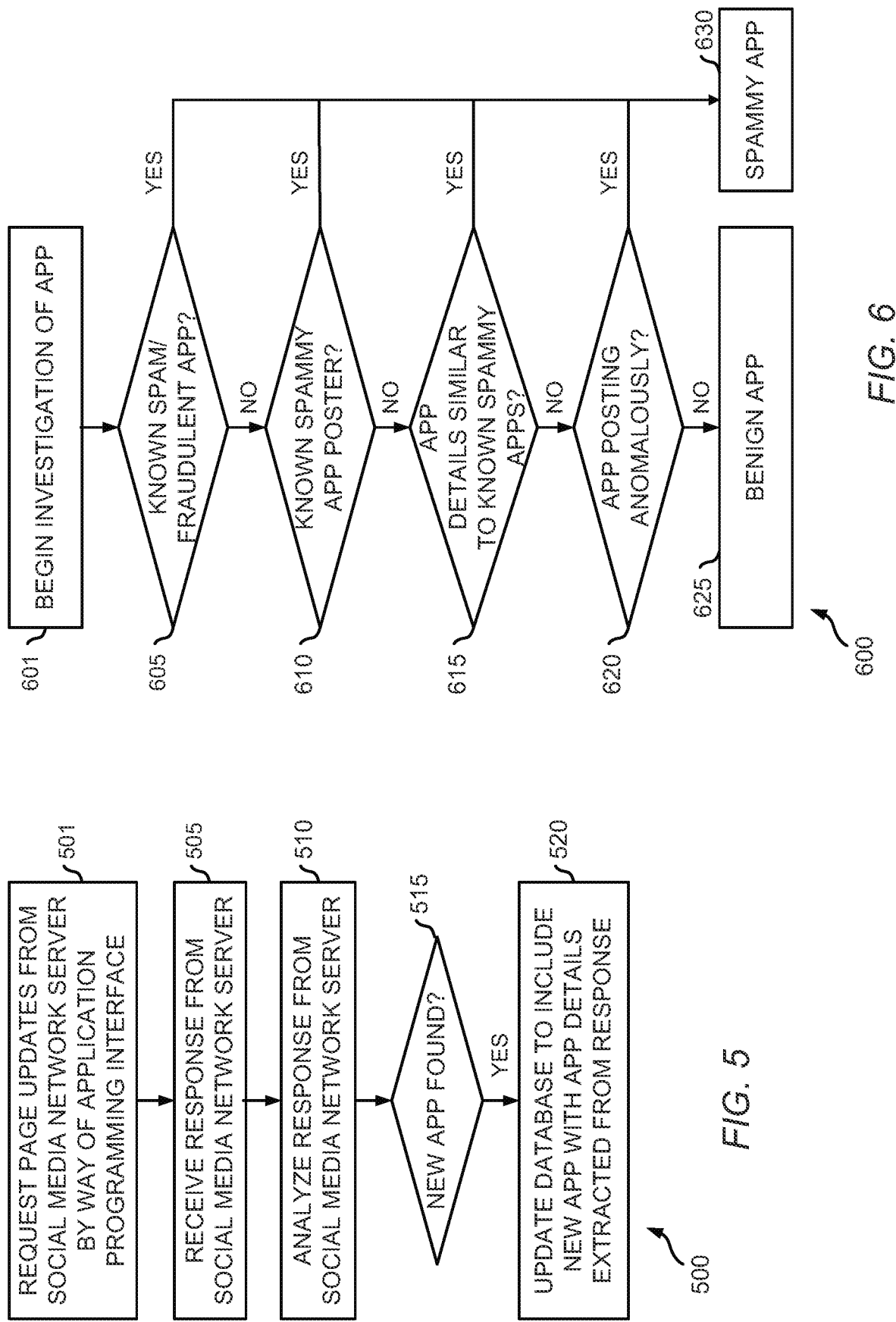

SPAMMY APP DETECTION SYSTEMS AND METHODS

CROSS-REFERENCE TO RELATED APPLICATIONS

This application is a continuation of, and claims a benefit of priority under 35 U.S.C. § 120 from, U.S. patent application Ser. No. 17/035,320, filed Sep. 28, 2020, issued as U.S. Pat. No. 11,615,182, entitled "SPAMMY APP DETECTION SYSTEMS AND METHODS," which is a continuation of, and claims a benefit of priority under 35 U.S.C. § 120 from, U.S. patent application Ser. No. 15/939,161, filed Mar. 28, 2018, issued as U.S. Pat. No. 10,789,355, entitled "SPAMMY APP DETECTION SYSTEMS AND METHODS," both of which are fully incorporated by reference herein for all purposes.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

TECHNICAL FIELD

This disclosure relates generally to the field of digital risk detection. More particularly, this disclosure relates to systems and methods for detecting fraudulent applications or active content on social media.

BACKGROUND OF THE RELATED ART

"Social media" refers to computer-mediated technologies that facilitate the creation and sharing of information, ideas, interests, and various forms of expression through virtual communities and networks. Today, social media have become the fertile ground for spamming or otherwise questionable activities. For example, suspicious "spammy" applications ("apps") and/or active content on social media, whether they have been compromised or are original, can suddenly increase in activity, and the fraudulent apps among them can successfully use social engineering attacks to obtain users' credentials.

While social media platforms such as Facebook may have some reporting mechanisms in place to allow their users to report suspicious posts, it can be extremely difficult and time consuming to differentiate between legitimate apps from fraudulent apps that run on social media. An additional challenge is the significant amount of social media data that would need to be processed at an ongoing basis for each of these apps.

In view of the foregoing, there is a need for innovations and improvements in the field of digital risk detection. Embodiments disclosed herein can address this need and more.

SUMMARY

An object of the invention is to provide a technical solution for efficiently, intelligently, and timely detecting a suspicious ("spammy") app on a social networking site ("social media") that may be fraudulent. Such a technical solution can significantly reduce digital risk.

In embodiments disclosed herein, this object is realized in a spammy app detection system configured for monitoring social media brand pages (which may be hosted by one or more social media platforms, for instance, Facebook, Twitter, etc.) on the Internet for digital risk protection purposes. The spammy app detection system has a spammy app detector and a database and has access to a massive amount of social media data across a large number of entities (e.g., brand companies) and their users (e.g., commenters, post authors, etc.). By examining the massive amount of social media data and keeping in the database an up-to-date list of new apps recently discovered by the spammy app detection system, the spammy app detection system can timely recognize a pattern or trend in the activities of a social media app and determine whether the social media app is behaving fraudulently—that is, whether the social media app is behaving in a spammy way.

For example, a social media app may begin posting to one or more social media accounts on a social media platform in an anomalous manner and thus its presence is discovered by the spammy app detection system. The spammy app detector may implement a spammy app detection algorithm which can be run on an hourly basis to investigate such a new social media app discovered by the spammy app detection system during a recent time period (e.g., four hours). The investigation determines posting behavior of a social media app based on a relative post rate, rather than an absolute threshold. To be efficient, the spammy app detection algorithm includes several stages of filtering. For each stage that is successfully passed by the social media app under investigation, the execution logic of the spammy app detector moves on to the next stage of the spammy app detection algorithm. When a social media app under investigation passes all the stages, the execution logic exits the process flow and there is no detection of a spammy app. In this way, the spammy app detection system can determine whether a social media app is posting atypically and thus is spammy.

In some embodiments, the spammy app detection system can ban a spammy app from posting to a social media brand page monitored by the spammy app detection system. Additionally or alternatively, the spammy app detection system can notify or alert the entity (e.g., an owner of a brand) that a fraudulent app is attacking their users. In this way, the spammy app detection system disclosed herein can catch a fraudulent app before it spreads to more users on the social media.

In some embodiments, the method may comprise sending a request to a social media network server for updates on a social media page hosted by the social media network server, receiving a response from the social media network server, analyzing the response from the social media network server, determining whether a new application is posting to the social media page (by, for instance, comparing an application name extracted from the response from the social media network server with application names stored in the database), and responsive to a new application posting to the social media page, updating the database to include details about the new application such as the application name. In some embodiments, the details can include at least one of a property indicating a social media platform, a unique identifier given by the social media platform to the application, an application display name, a creation date indicating a date when an entry is created in the database for the new application, or an update date indicating a last time when the entry is updated.

In some embodiments, a method for investigating social media applications may include searching a database for any new social media application discovered by a spammy app detection system during a past time period (e.g., four hours, a day, etc.). The method may be performed by the spammy app detection system on a server computer at a predetermined time interval (e.g., on an hourly basis, etc.). The method may further comprise executing a spammy app detection algorithm on the server computer, spammy app detection algorithm comprising a plurality of stages, including determining whether the social media application discovered by the spammy app detection system during the past time period is a known fraudulent application; determining whether a poster of the social media application discovered by the spammy app detection system during the past time period is a known spammy user; determining whether the social media application discovered by the spammy app detection system during the past time period is similar to a known fraudulent application; and determining whether the social media application discovered by the spammy app detection system during the past time period is posting to a social media page through user accounts anomalously.

In some embodiments, the social media application is determined to be similar to a known fraudulent application when a name of the social media application is a variation of a known fraudulent application name. In some embodiments, the social media application is determined to be similar to a known fraudulent application when a name of the poster of the social media application is a variation of a known spammy user In some embodiments, the method may further comprise identifying the social media application as a benign application in response to the social media application passing the plurality of stages, or as a spammy app in response to the social media application failing any of the plurality of stages. The method may include updating the database to include a result from the identifying.

In some embodiments, the method may determine or classify a spammy application by first determining a day in a past month where the social media application posts more than N times. Responsive to the social media application posting more than N times in the day, the method may determine an author that posts more than M times in the day; determine a window of time in the day having highest number of posts by the author, determine whether the author posted more than X times in a fragment of time within the time of time in the day, determine what application the author used to post more than X times in the fragment of time within the time of time in the day, and mark the application the author used to post more than X times in the fragment of time within the time of time in the day as a spammy application.

In some embodiments, the method may further comprise examining historical social media data which includes a monthly total of posts, identifying a month having at least a number (e.g., 100) of posts, determining whether the monthly total of posts has doubled in next month, determining whether posts have increased by at least ten times from one day to next day in the next month, determining whether an author has posted more than seven times in the next day, determining an hour within the next day during which the author has highest number of posts, and identifying an application used by the author to post more than six times in one minute in the hour as a spammy application.

One embodiment may comprise a system having a processor and a memory and configured to implement the method. One embodiment may comprise a computer program product that comprises a non-transitory computer-readable storage medium which stores computer instructions that are executable by a processor to perform the method. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 5 is a flow diagram illustrating a spammy app discovery process according to some embodiments.

FIG. 6 is a flow diagram illustrating an execution logic flow of a spammy app detection algorithm according to some embodiments.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
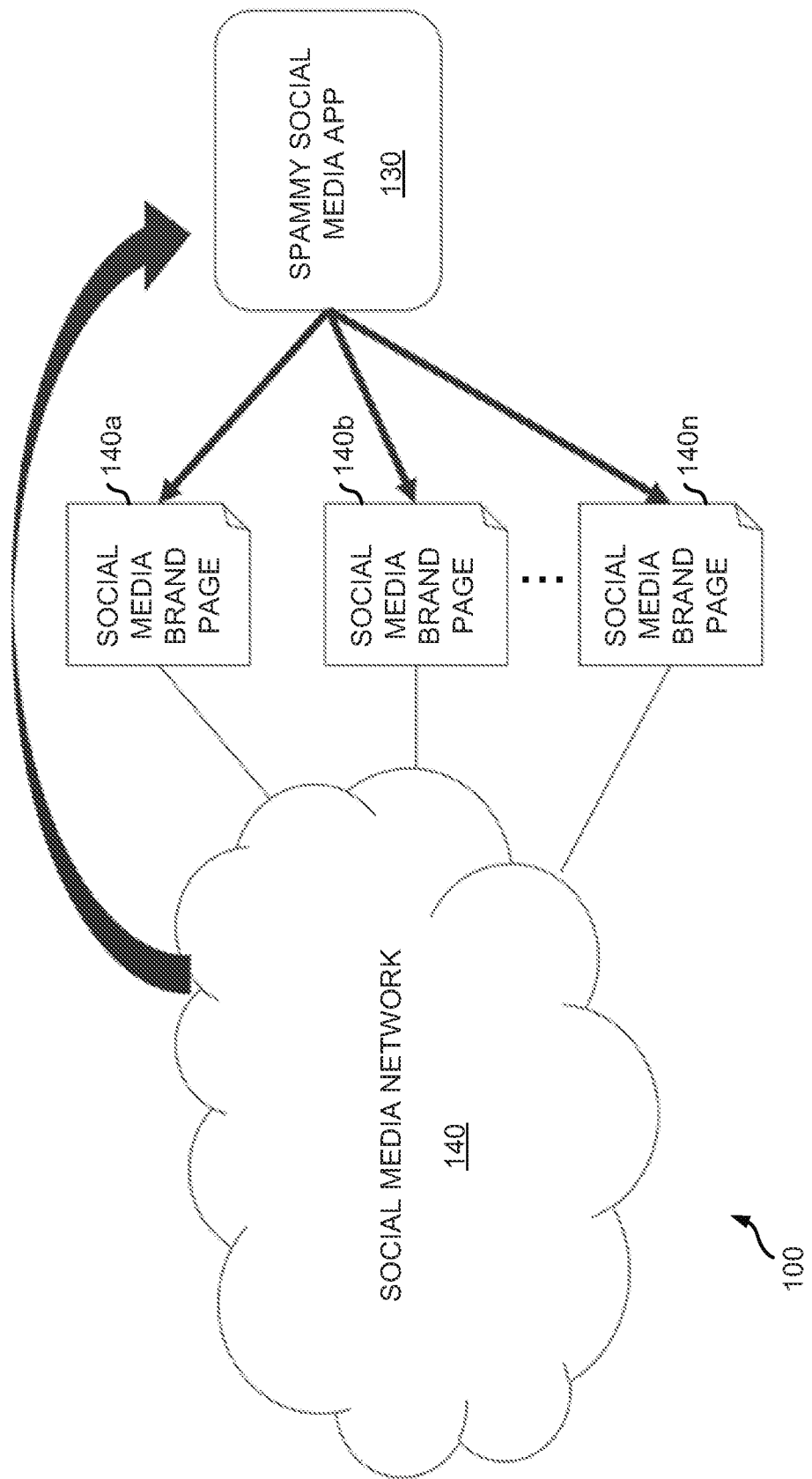
FIG. 1 depicts a diagrammatic representation of a distributed computing environment having a social media network where a social media platform hosts social media brand pages associated with various entities such as brand companies.

FIG. 1 is a diagrammatic representation of a distributing computing environment 100 having a social media network 140 where a social media platform (e.g., Facebook, Twitter, etc.) hosts social media brand pages 140a, 140b, . . . , 140n associated with various entities (e.g., brand companies). A "brand," in this case, can be a type of product or service provided by a particular company, organization, or person under a particular name. In some cases, a social media app 130 may post comments to social media brand pages 140a, 140b, . . . , 140n. These comments may contain links or references (e.g., universal resource locators (URLs), etc.) to certain domains (e.g., websites). These comments may provide some incentives (e.g., "get more likes") for social media brand page users to click or select the links in the comments. When social media brand page users click or select the links in the comments posted by the social media app 130, they are directed to the referenced websites which contain instructions on how to install the social media app 130 on their individual social media user accounts. Once installed on the social media user accounts, the social media app 130 is known to the social media network 140 and can post to social media brand pages 140a, 140b, . . . , 140n on behalf of those social media brand page users.

Social media platforms can have massive numbers of users (e.g., millions or even billions of users). As such, their reach can carry significant potential impacts both for entities (e.g., brand companies) and their customers with whom they interact through social media brand pages. Comment spam dilutes these interactions at best and, at worst, exposes potential customers to phishing and malware. The social media app installation process described above might be compromised by an attacker or spammer, turning a legitimate app into a spammy app and resulting in social media brand page users being attacked by fraudulent postings.

Figure 2:
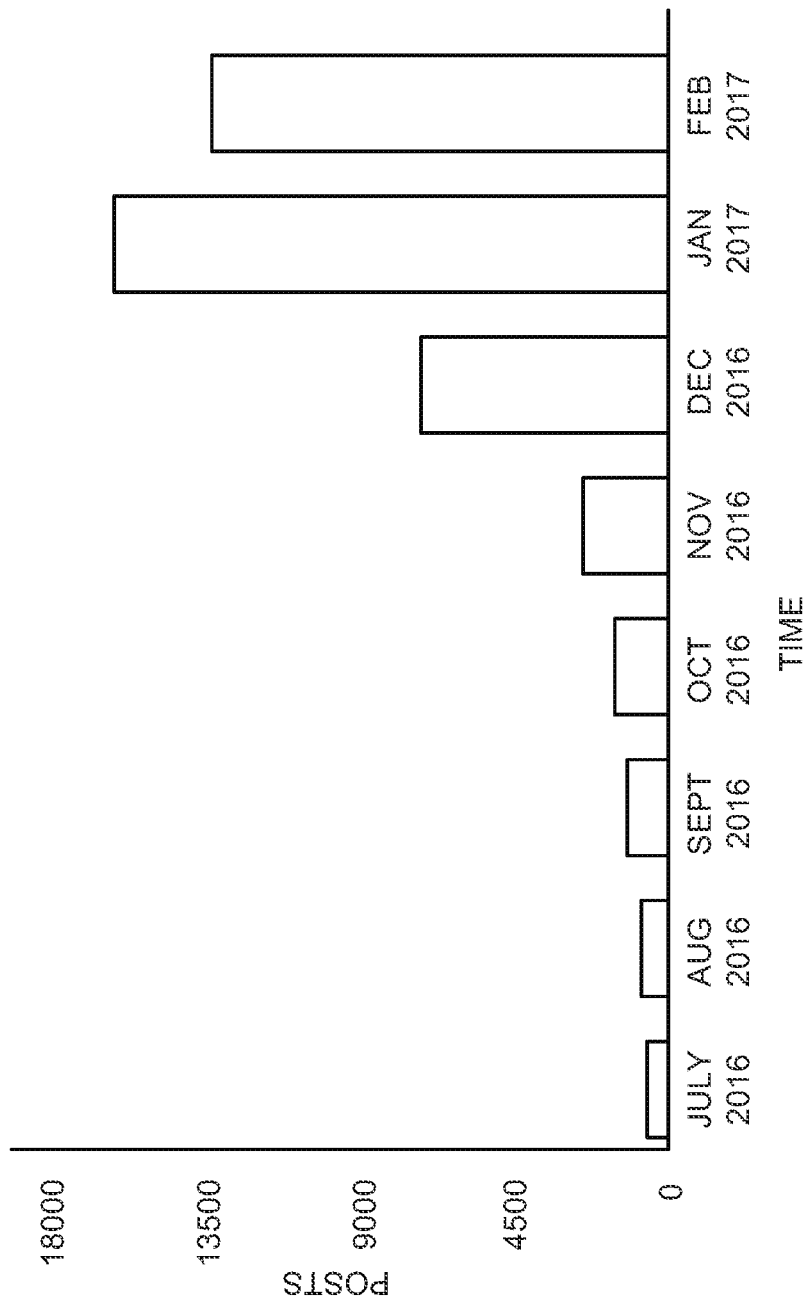
FIG. 2 is a bar graph showing the number of times posted by a social media app to a social media platform during a time period.

As an example, "HTC Sense" is a social media app that is integrated in other apps such as People, Friend Stream, Gallery, and Calendar to give its users up-to-date information about their contacts (e.g., their instant status updates in People, shared links, photos, etc.) in these apps. FIG. 2 is a histogram showing the number of times posted by "HTC Sense" to a social media platform (e.g., Facebook) per month during the time period of July 2016 to February 2017. Statistics show that "HTC Sense" alone reached across 198 different Facebook pages, posted by 4,267 different authors, and posted a total of 45,234 times during that time period. The statistics also show that "HTC Sense" hardly made any posts before July 2016.

Normally, a popular social media page may receive, on average, about 400 comments per day. Further, on average, a person may post two to three comments per day per social media page. These are considered normal posting behaviors when comments are posted by humans (e.g., commenters, post authors, etc.). Compared to these normal behaviors, the behavior of "HTC Sense," which can be observed by the number and frequency of posts made by "HTC Sense" during the time period, is suspicious. In this disclosure, this type of posting behavior is considered "spammy" and a social media app exhibiting this type of posting behavior is referred to as a spammy app. At this time, the social media app is acting/behaving in a suspicious way (i.e., it is acting or behaving spammy) way, but has not yet been confirmed as a spam app.

As discussed above, some social media platforms may have some reporting mechanisms in place to allow their users to report suspicious posts made by social media applications. However, such a user-reporting approach is passive and the investigation driven by such reporting can largely be a manual process. For example, to confirm a reported suspicion that a social media app is spamming a particular social media page, a team of highly skilled digital risk researchers has to manually investigate and analyze all the relevant data (e.g., the interactions among a particular social media app, a social media network server, user devices, etc.). While this manual investigation serves the need to protect social media brand page users from getting attacked (i.e., from spam attacks posting continuously on a social media brand page), it can be time consuming, inefficient, and not scalable. These drawbacks are due, in part, to the fact that it can be extremely difficult for humans to reliably, objectively, and consistently distinguish fraudulent apps from legitimate apps that run on social media platforms. Further, the significant amount of social media data that must be processed and analyzed at an ongoing basis for each of these apps presents a challenge to thoroughly investigate such reports and take appropriate actions in a timely manner.

Embodiments disclosed herein are directed to a new technological solution that can automatically, efficiently, and timely investigate and identify a spammy app. Before describing embodiments in detail, it might be helpful to understand how a spammy app might gain access to social media user accounts on a social media platform. This is described below with reference to FIG. 3 which depicts a diagrammatic representation of a social media app installation and authentication process 300. Skilled artisans understand how social media platforms such as Facebook and Twitter (which are represented in FIG. 3 by a social media network 340) interact with their users through programs (e.g., web browsers, Facebook app, Twitter app, etc.) running on user devices (which are represented by a user device 310) and the necessary computer network architecture (e.g., the Internet).

Figure 3:
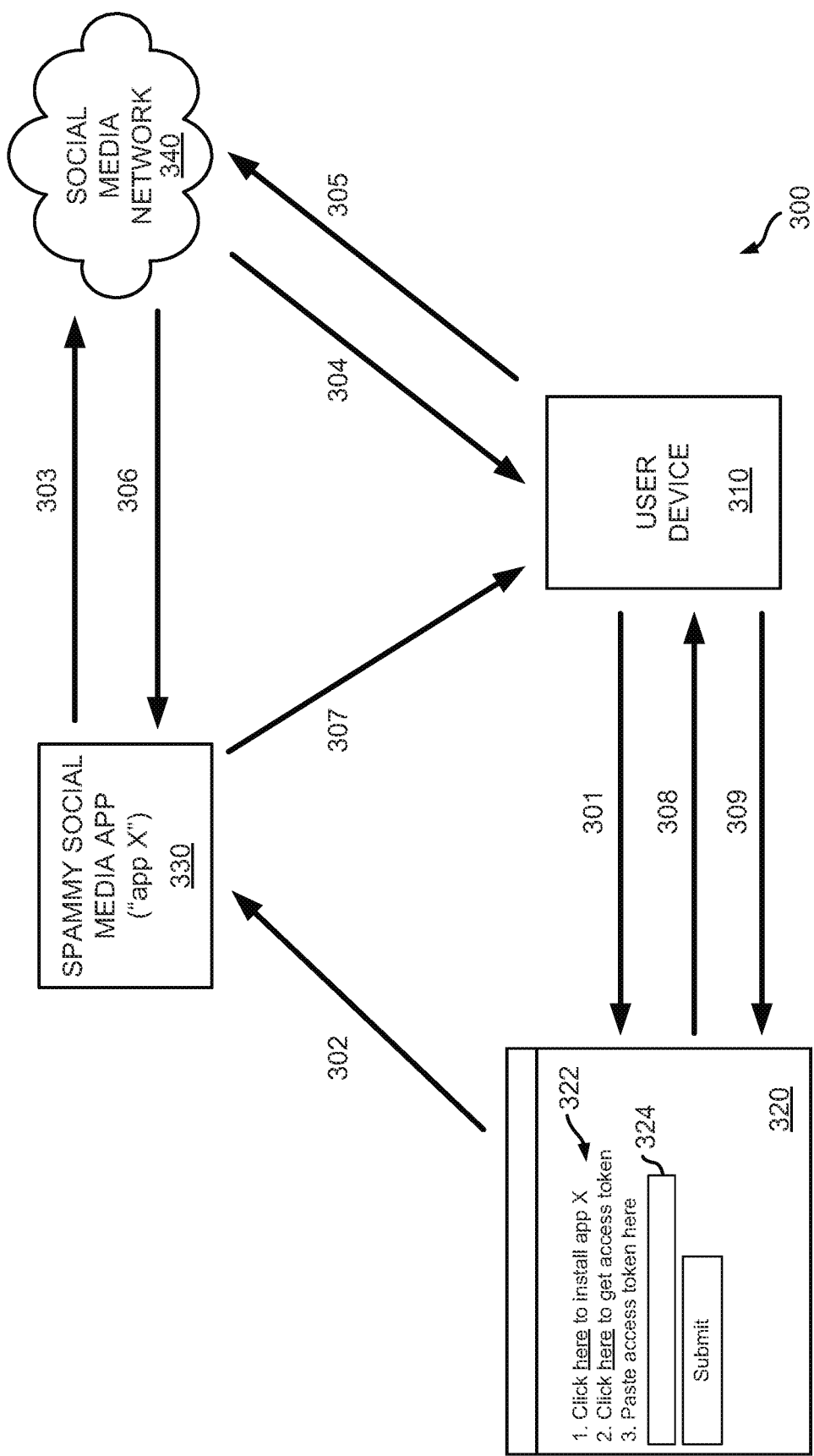
FIG. 3 depicts a diagrammatic representation of a social media app installation and authentication process.

As illustrated in FIG. 3, when a user (e.g., a social media brand page user) clicks or selects, through user device 310, a link in a comment posted to a page (e.g., a social media brand page) on a social media platform on the Internet, the user is directed to a referenced website or, specifically, to a web page 320 at a URL of the referenced website (301). Other ways of directing the user to the URL is also possible, for instance, through a link in an email, text message, etc.

The web page 320 contains instructions 322 on how to install a social media app 330 ("app X") on the user's user account with a social media network 340. The user follows the instructions 322 to grant the social media app 330 with access to the user's user account with the social media network 340 (302). The social media app 330 is redirected to the social media network 340 for authorization (303). A server on the social media network 340 displays the social media app 330 on the user device 310 and the permissions the social media app 330 is requesting, and authenticates the user if the user chooses to allow the social media app 330 to access the user's profile (304). The user authenticates with the social media network server (305). The social media network server grants the social media app 330 permissions and gives an access token for the social media app 330 so it can independently operate on behalf of the user (306). The user is notified that the social media app 330 is installed (307).

So far the social media app installation and authentication process 300 can appear to be installing a legitimate social media app on the user's social media account. That is, the social media app 330 can itself be a legitimate social media app. However, the social media app installation and authentication process 300 can be hijacked by a spammer through social engineering. For example, an incentive to trade for likes can socially engineer or cause the user to perform the following steps.

The instructions 322 on the web page 320 include an instruction for the user to click a link to get an access token. This is a link to a developer page provided by the social media network 340, usually for the purpose of testing apps. The link includes an application identifier (app ID) of the social media app 330. When the link is clicked or selected, a request for access token is sent along with the app ID to a server on the social media network 340 (e.g., an app test server). In response, the app test server returns an access token for the app ID and directs the user to the developer page which prominently displays the access token (308).

The user is instructed to paste the access token into a form or input field 324 on the web page 320, thus enabling a Spammer's third-party app to operate fully on behalf of the user and masquerade as a legitimate social media app (309).

The end result of the social media app installation and authentication process 300 described above can potentially have a significant impact on the users of the social media network 340 and on the brands targeted by the entity (e.g., a spammer) controlling questionable websites (represented by the web page 320 in FIG. 3) and suspicious social media apps. This scheme (e.g., the social media app installation and authentication process 300) relies on users turning over an app access token that connects their profiles to a third-party app with extensive capabilities related to their user profiles. Exploiting the human factor in this way provides a spammer with powerful capabilities to target and spam organizations of their choice without even needing to hack or alter the code of a legitimate social media app.

To spam a target page (e.g., a social media brand page of a brand company) on a social media platform, the spammer uses the spammy social media app to post comments to the target page on behalf of a user. The spammy social media app does not post these comments as the user. Rather, the spammy social media app posts comments on behalf of the user. This is because the spammy social media app is not logged into the social media platform as the user. It is posting comments to the target page using the app ID and the access token, under the disguise of a legitimate social media app having a proper permission to do so on behalf of the user. Because the access token is specifically tied to the app ID, uninstallation of the spammy social media app from the user's account will remove the access token from the social media platform and the spammy social media app will no longer be able to post on behalf of that user again. However, as most users do not usually check what they have posted across social media sites and/or pages, they may not realize, or may take a long time to realize, what and/or how a spammy social media app is posting on their behalf.

Figure 4:
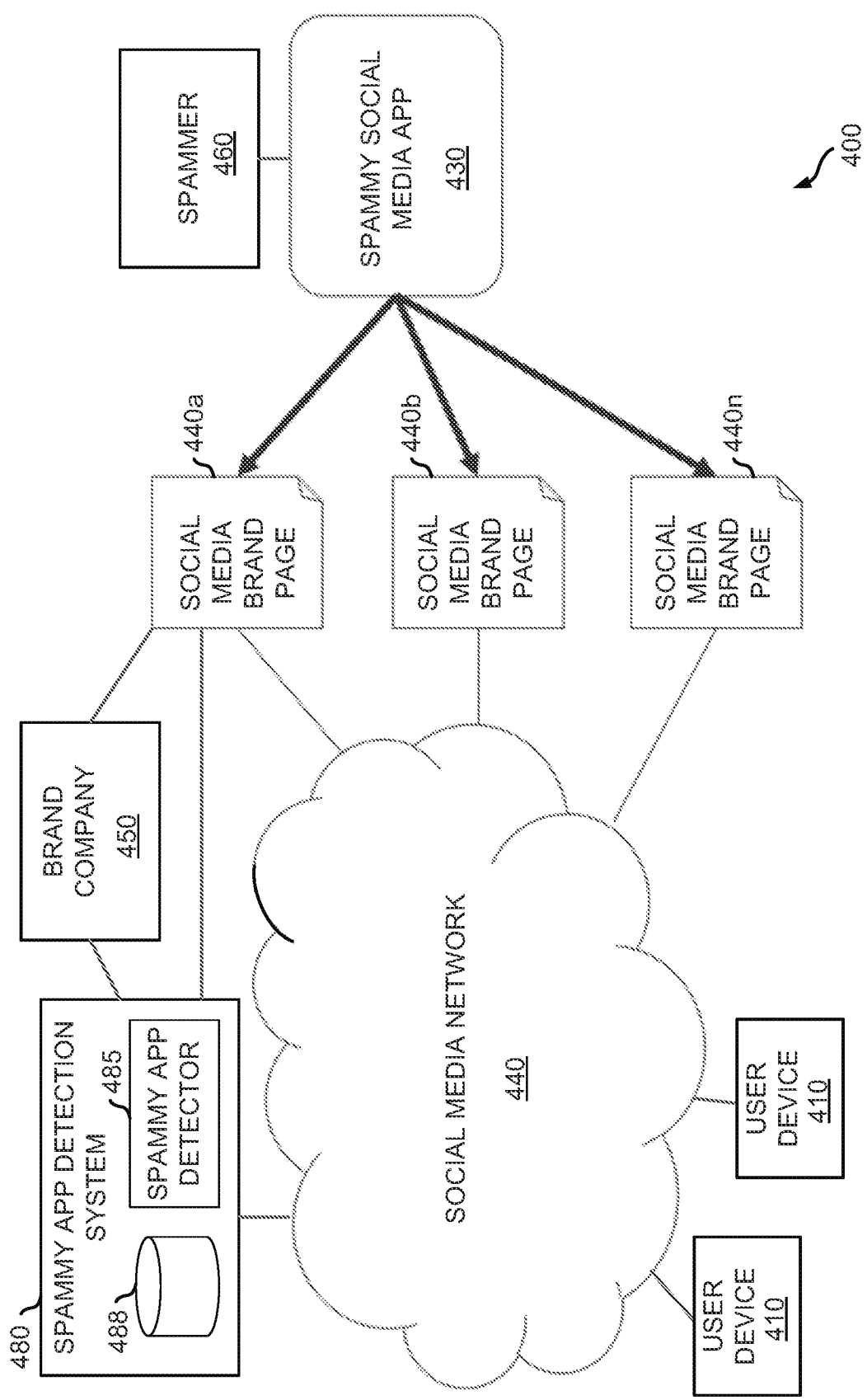
FIG. 4 depicts a diagrammatic representation of a distributed computing environment where embodiments disclosed herein can be implemented.

Embodiments can aid in protecting social media users and entities alike against such spam attacks, address the aforementioned drawbacks, and provide technical benefits and advantages. FIG. 4 depicts a diagrammatic representation of a distributed computing environment 400 where embodiments disclosed herein can be implemented.

In the example of FIG. 4, the user devices 410, the spammy social media app 430, the social media network 440, and the social media brand pages 440a, 440b, . . . , 440n can be similar to the user device 310, the spammy social media apps 130, 330, the social media networks 140, 340, and the social media brand pages 140a, 140b, . . . , 140n described above. As illustrated in FIG. 4, the spammy social media app 430 can be controlled by an entity referred to as the spammer 460. Originally, the social media app 430 can be a legitimate social media created by another entity. The spammer 460 may use social engineering methods to trick social media users into getting a secrete access token from the social media network 440 and providing the secrete access token to the spammer 460, allowing the spammer 460 to control the spammy social media app 430 and post comments on behalf of the users through the spammy social media app 430 that the users had installed on their user accounts with the social media network 440.

Embodiments provide a spammy app detection system 480 to monitor social media brand pages (e.g., the social media brand page 440a of a brand company 450) and detect spammy apps quickly (e.g., daily, hourly, at a scheduled time interval, on demand, etc.). Once detected, the identity of a spammy app can be provided to a downstream computing facility for further processing and/or actions (e.g., generating a notification and sending the notification to a social media platform and/or the users affected by the spammy app so that the spammy app can be removed, banning or preventing the spammy app from posting to the social media brand page 440a, etc.). A notification or report may also be sent to the brand company 450.

The spammy app detection system 480 may include a spammy app detector 485 and a database 488. These system components are described in detail below with reference to FIGS. 5 and 6. In particular, FIG. 5 is a flow diagram illustrating how the spammy app detection system 480 can maintain an up-to-date list of spammy apps in the database 488 through a spammy app discovery and database updating process 500 and FIG. 6 is a flow diagram illustrating the execution logic flow 600 of a spammy app detection algorithm. Although not shown in FIG. 4, spammy app detection system 480 can include a user interface module configured for generating and providing a user interface, portal, or dashboard to the user devices 410 for presenting outcomes generated by the spammy app detector 485 on the user devices 410.

In some embodiments, the spammy app discovery and database updating process 500 can be run daily, hourly, at a scheduled time interval (e.g., every five minutes), or on demand by a system (e.g., the spammy app detection system 480). The system may begin the spammy app discovery and database updating process 500 by sending, through an application programming interface (API) of a social media network server, a request for updates on a social media page (e.g., the social media brand page 440a) monitored by the system (501). The social media network server returns a response containing updates on the social media page. Such updates can include comments made by commenters or post authors (e.g., users and/or social media apps) and details about them (e.g., app name, content, app ID, etc.). The system receives the updates from the social media network server (505) and operates to analyze the response from the social media network server (510) and determine whether any new app can be found in the response from the social media network server (515). If so, the system updates a list or table in a database (e.g., the database 488) to include the new app and app details extracted from the response (520). The list or table can be populated with app IDs per social media platform, time for the most recent post, etc.

Below is an example of a response from a social media network server. In this example, the response is in the JavaScript Object Notation (JSON) format. JSON is known to those skilled in the art and thus is not further described herein.

```
{
    "application": {
        "category": "Utilities",
        "link": "/iphone",
        "name": "SocialMed for iPhone",
        "namespace": "smiphone",
        "id": "8828568378"
    },
    "can_comment": false,
    "can_like": true,
    "comment_count": 0,
    "can_remove": false,
    "created_time": "2012-09-23T13:27:56+0000",
    "id": "80070202018_10151267391572018_26078328",
    "is_hidden": false,
    "is_private": false,
    "like_count": 0,
    "message": "This is a message content",
    "user_likes": false,
    "from": {
        "name": "Name of the account",
        "id": "810027625836698"
    },
}
```

As exemplified above, the response contains many fields that can be used by the system to identify a new app and determine the app's spam risk. For example, the "application" fields provide information about an app with which the user is posting. By using the value in the "message" field of the response, the system can compare the content posted by the app with content posted in the past and stored in the database. The "from" field provides information on the name of an author which the system can use to search the database and learn what other kind(s) of content the author has posted before. Using information from the "created_time" field, the system can determine a pattern of posting, volume, and timeseries of either the app or the author.

As a non-limiting example, the following items of information are extracted from the response and stored in the database (e.g., in an "item apps" table):

Property (which indicates a social media platform an app is on)

App name (which is a name that the app developer gives the app, such as "HTC Sense")

App Native ID ("app_native_id") (which is a unique ID given to the system by the social media platform to lookup the app in their API)

App Display Name ("app_display_name") (which a name that is displayed to the user, so it can also be the same as the app name, such as "HTC Sense")

Creation Date ("the created_at date") (which is the time the system first noticed or discovered the app and created an entry for the app in the database)

Update Date ("updated_at date") (which indicates the last time the database saw the app).

In some embodiments, at a scheduled time interval (e.g., every hour, etc.), the execution logic flow 600 is automatically run (e.g., as a job performed by the system which executes the spammy app detection algorithm described below). In some embodiments, the execution logic flow 600 begins by getting a list of apps from the database for investigation (601). In some embodiments, not every app in the database is investigated. Rather, apps discovered and stored in the database during the past time period (e.g., four hours) are investigated.

Social media apps can vary in terms of activity and volume depending how popular they are with respect to a particular social media platform. A popular social media app can be expected to make less than 100 posts per month on all accounts across the database. This number can grow depending on the accounts that are discovered by the system. However, abnormal growth can indicate an anomalous behavior. Referring to the example of FIG. 2, the number of posts by "HTC Sense" per month grew to well over 10,000 posts across the same number of accounts in early 2017, indicating that "HTC Sense" was likely posting anomalously.

Here, the system can determine whether such posting behavior is spammy based on a relative post rate, rather than an absolute threshold. To be efficient, the spammy app detection algorithm includes several stages of filtering. For each stage that passes, the execution logic flow 600 moves on to the next stage of the spammy app detection algorithm. When an app under investigation passes all the stages, the execution logic flow 600 exits and there is no detection of a spammy app. In this way, the system can detect anomalous posting activities of spammy apps.

The database may maintain a list of known SPAM/fraudulent apps. The execution logic flow 600 is operable to compare the name of an app under investigation with the names of known SPAM/fraudulent apps on the list (605). If the name of the app matches the name of a known SPAM/fraudulent app, the app is determined to be spammy (630). If no match is found, the execution logic flow 600 proceeds to the next stage and determines whether the poster (e.g., a commenter or a post author) is a known spammy app poster (i.e., a "convicted" spammy user), utilizing a list of known spammy app posters stored in the database (610). Here, a "convicted" spammy user may refer to a user known to the system as having been posting fraudulent content before. Again, if a match is found, the app is determined to be spammy (630). If no match is found, the execution logic flow 600 proceeds to the next stage and determines whether the app is similar to any known spammy apps (615). This can be done by comparing details of the app extracted from the response with details of known spammy apps stored in the database. For example, the name of the app may not match exactly to any known SPAM/fraudulent apps stored in the database (and hence would pass the check at step 605). However, the name of the app is actually a variation or a misspelled name of a known SPAM/fraudulent app and can be objectively quantified (through a similarity scoring method) as being similar to the name of the known SPAM/fraudulent app. If the system determines that the app is similar to a known spammy app, the app is determined by the system as a spammy app (630). Otherwise, the execution logic flow 600 proceeds to the last stage (620).

The system can have a plurality of different proprietary language classifiers for analyzing content from social media apps. The content from the social media app itself can be analyzed over a plurality (e.g., 100) of different proprietary language classifiers, in addition to detecting whether the language of the content posted by the social media app is different from what a typical message would be on a particular social media account in question. In some embodiments, the system can implement a special spam classifier particularly configured for temporal-volumetric behavior detection as follows:

Determine where there is any day in the past month where the app posts more than N times from one day to the next day.

If so, for that day (or time period), determine where there are any posts more than M times by the same author in that day (or time period).

Next, find the hour (or a window within the time period) with the most posts by the same author.

Next, determine the author and determine whether the author posted more than X times in one minute (which is a fragment within the time in the time period).

Determine what app the author used to post more than X times in that time fragment within the time in the time period. This app is marked by the spam classifier as "spammy."

The pseudocode for a non-limiting example of a volume-driven rules-decision algorithm is as follows:

If one month has at least a certain number (e.g., 100) of posts, check to see whether the number of posts has doubled in the next month.

Take the "next month" and determine whether there are any days in that month where the posts have increased by at least 10 times from one day to the next day.

Take the "next day" and determine whether there is one author that has posted more than 7 times.

Within this day, determine the hour during which the particular author has the highest amount of activity (e.g., number of posts).

If the author has posted more than 6 times in one minute, then the app the author is using is considered a spammy app.

The system keeps, in the database, a list of authors, the number of their posts, when they posted, and what they posted.

To illustrate, below are some example types of "spammy" content or posts:

"There is a giveaway for $500 Walmart gift cards. I got one and won 5 more for friends. If interested, use this promo code: http://lesvideostn.com/?GiftCode=k13COP3JhYB9jdo"

"Now you can see who is secretly looking at your profile! So many people spying!! Just check out this app here: https://apps.facebook.com/rvealyourwth/?fb=ln6XAVFJapF7"

"Check my status update to get free tshirt from facebook"

"Get MORE likes for your status/picture and 500 FOLLOWERS? read more on>>autolikeme.yolasite.com«?5"

The system can detect "call to action" type of content in the posts. A "call to action" refers to the action the spammer or attacker wants the user to perform after reading a post. Such a "call to action" may include a promise or incentive by the spammer or attacker that is unusual, or outside the realm of what a social media platform generally allows. For example, a user realistically cannot view who is "looking at your profile," and getting "more likes" by paying for it is not in the spirit of today's social media platforms.

The system can examine the content using a decision-tree type rule-list ("if this," "then that," etc.), rather than a lexicon detection. For instance, the following examples would not be classified as "spammy," even though they contain the word "free" or "app" or "security." Although they may look "spammy" to humans, they are actually not "spammy" to the system:

"Grateful Dead Big Love Paranormal State on A&E BareMinerals by Bare Escentuals Johnson's Baby Facebook Security APPLE is giving FREE APPLE iPAD 3 to all the US Fans. Register your email and details here Hurry! Claim for it before the offer gets off."

"ALERT: We continue to get feedback on a FAKE promotion on Facebook regarding Dell "I just got a new Dell XPS laptop to test out and keep without paying anything"—this is a spam message coming from a third party. In order to guard against these types of messages, follow these steps and visit Facebook's guide to security: 1. Change your Facebook password 2. Be selective about apps authorize to interact with your Facebook account, remove any unfamiliar ones 3. If your Facebook account may have been hacked, utilize Facebook's "Secure Your Account" feature: ( )"

"Watch movies and tv online with Netflix!! Get a free month now. FreeNetflixCodes(dot)tk"

If the system determines that the app is not posting anomalously, by volume or by content, the app is determined to be a benign app and the execution logic flow 600 ends (625). Otherwise, the app is determined to be a spammy app (630).

As discussed above, a result from the execution logic flow 600 can be provided to a subsequent computing facility for further processing (e.g., generating and sending a notification, preparing a digital risk report, updating a digital risk profile and/or dashboard for a brand company, etc.) and/or to an authorized user (e.g., a digital risk specialist) for review through a user interface of the system. Other implementations and uses of the result from the execution logic flow 600 are also possible.

For example, in some embodiments, the spammy app detection system can ban a spammy app from posting to a social media brand page monitored by the spammy app detection system. Additionally or alternatively, the spammy app detection system can notify or alert the entity (e.g., an owner of a brand) that a fraudulent app is attacking their users. In this way, the spammy app detection system disclosed herein can catch a fraudulent app before it spreads to more users on the social media.

Figure 7:
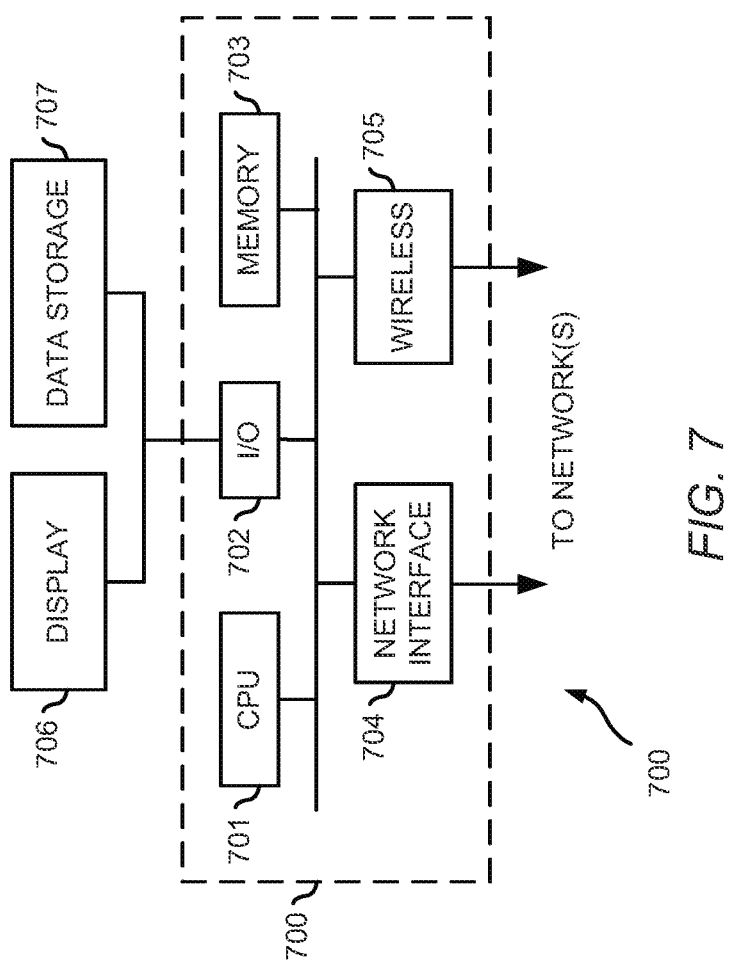
FIG. 7 depicts a diagrammatic representation of a data processing system for implementing a spammy app detection system according to some embodiments.

FIG. 7 depicts a diagrammatic representation of a data processing system for implementing a system for spammy app detection. As shown in FIG. 7, data processing system 700 may include one or more central processing units (CPU) or processors 701 coupled to one or more user input/output (I/O) devices 702 and memory devices 703. Examples of I/O devices 702 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to external computers or other devices through network interface 704, wireless transceiver 705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
monitoring, by a spammy app detection system executing on a processor, a target page on a social network, wherein the monitoring comprises:
sending a request for updates on the target page to the social network;
receiving a response to the request from the social network;
analyzing the response containing the updates on the target page; and
based on the analyzing, determining that a new app has posted a comment to the target page on behalf of a user and that the new app has failed at least one of a plurality of checks, the plurality of checks comprising:
determining whether the name of the new app matches the name of a fraudulent app known to the spammy app detection system;
determining whether the user is a spammy user known to the spammy app detection system;
determining whether the new app is similar to any spammy apps known to the spammy app detection system, the determining including comparing details of the new app extracted from the response with details of known spammy apps stored in a database; and
determining whether the new app is posting to the target page anomalously by volume or by content; and
updating, by the spammy app detection system, the database to include the new app as a spammy app.

2. The method according to claim 1, wherein the target page is created on the social network by a first entity and wherein the spammy app is controlled by a second entity.

3. The method according to claim 1, wherein the request for updates on the target page is sent to the social network on a daily basis, on an hourly basis, at a scheduled time interval, or on demand.

4. The method according to claim 1, further comprising:
generating a notification or report identifying the spammy app; and
sending the notification or report to the social network, the user, an entity associated with the target page, a downstream computing facility, or a combination thereof.

5. The method according to claim 1, further comprising:
generating a user interface, a portal, or a dashboard containing an outcome of the monitoring; and
providing the user interface, the portal, or the dashboard to a user device for presenting the output of the monitoring on the user device.

6. The method according to claim 1, wherein the updating the database comprises populating a list or table with the details of the new app extracted from the response.

7. The method according to claim 1, wherein the response is in JavaScript Object Notation (JSON) format.

8. A spammy app detection system, comprising:
a processor;
a non-transitory computer-readable medium; and
instructions stored on the non-transitory computer-readable medium and translatable by the processor for:
monitoring a target page on a social network, wherein the monitoring comprises:
sending a request for updates on the target page to the social network;
receiving a response to the request from the social network;
analyzing the response containing the updates on the target page; and
based on the analyzing, determining that a new app has posted a comment to the target page on behalf of a user and that the new app has failed at least one of a plurality of checks, the plurality of checks comprising:
determining whether the name of the new app matches the name of a fraudulent app known to the spammy app detection system;
determining whether the user is a spammy user known to the spammy app detection system;
determining whether the new app is similar to any spammy apps known to the spammy app detection system, the determining including comparing details of the new app extracted from the response with details of known spammy apps stored in a database; and
determining whether the new app is posting to the target page anomalously by volume or by content; and
updating the database to include the new app as a spammy app.

9. The spammy app detection system of claim 8, wherein the target page is created on the social network by a first entity and wherein the spammy app is controlled by a second entity.

10. The spammy app detection system of claim 8, wherein the request for updates on the target page is sent to the social network on a daily basis, on an hourly basis, at a scheduled time interval, or on demand.

11. The spammy app detection system of claim 8, wherein the instructions are further translatable by the processor for:
generating a notification or report identifying the spammy app; and
sending the notification or report to the social network, the user, an entity associated with the target page, a downstream computing facility, or a combination thereof.

12. The spammy app detection system of claim 8, wherein the instructions are further translatable by the processor for:
generating a user interface, a portal, or a dashboard containing an outcome of the monitoring; and
providing the user interface, the portal, or the dashboard to a user device for presenting the output of the monitoring on the user device.

13. The spammy app detection system of claim 8, wherein the updating the database comprises populating a list or table with the details of the new app extracted from the response.

14. The spammy app detection system of claim 8, wherein the response is in JavaScript Object Notation (JSON) format.

15. A computer program product for spammy app detection, the computer program product comprising a non-transitory computer-readable medium storing instructions translatable by a processor of a spammy app detection system for:
monitoring a target page on a social network, wherein the monitoring comprises:
sending a request for updates on the target page to the social network;
receiving a response to the request from the social network;
analyzing the response containing the updates on the target page; and
based on the analyzing, determining that a new app has posted a comment to the target page on behalf of a user and that the new app has failed at least one of a plurality of checks, the plurality of checks comprising:
determining whether the name of the new app matches the name of a fraudulent app known to the spammy app detection system;
determining whether the user is a spammy user known to the spammy app detection system;
determining whether the new app is similar to any spammy apps known to the spammy app detection system, the determining including comparing details of the new app extracted from the response with details of known spammy apps stored in a database; and
determining whether the new app is posting to the target page anomalously by volume or by content; and
updating the database to include the new app as a spammy app.

16. The computer program product of claim 15, wherein the target page is created on the social network by a first entity and wherein the spammy app is controlled by a second entity.

17. The computer program product of claim 15, wherein the request for updates on the target page is sent to the social network on a daily basis, on an hourly basis, at a scheduled time interval, or on demand.

18. The computer program product of claim 15, wherein the instructions are further translatable by the processor for:
generating a notification or report identifying the spammy app; and
sending the notification or report to the social network, the user, an entity associated with the target page, a downstream computing facility, or a combination thereof.

19. The computer program product of claim 15, wherein the instructions are further translatable by the processor for:
generating a user interface, a portal, or a dashboard containing an outcome of the monitoring; and
providing the user interface, the portal, or the dashboard to a user device for presenting the output of the monitoring on the user device.

20. The computer program product of claim 15, wherein the updating the database comprises populating a list or table with the details of the new app extracted from the response.

\* \* \* \* \*